US007613711B2

(12) United States Patent
Dutta et al.

(10) Patent No.: US 7,613,711 B2
(45) Date of Patent: Nov. 3, 2009

(54) SPECIFICATION OF A HIERARCHICAL AUTHORIZATION MODEL FOR A DBMS—SQL LANGUAGE EXTENSIONS

(75) Inventors: Tanmoy Dutta, Sammamish, WA (US); Girish Chander, Redmond, WA (US); Ziquan Li, Redmond, WA (US); Steven Richard Gott, Bellevue, WA (US); Clifford T. Dibble, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 406 days.

(21) Appl. No.: 11/151,998

(22) Filed: Jun. 14, 2005

(65) Prior Publication Data

US 2006/0282433 A1    Dec. 14, 2006

(51) Int. Cl.
    *G06F 17/30* (2006.01)
(52) U.S. Cl. ............... 707/100; 707/9; 707/10; 707/201; 709/248; 709/232; 709/229; 709/225; 713/180; 713/186; 713/176
(58) Field of Classification Search ............ 707/100, 707/9, 10, 201; 709/248, 232, 229, 225; 713/180, 186, 176
    See application file for complete search history.

(56) References Cited

U.S. PATENT DOCUMENTS

| 5,335,346 | A | * | 8/1994 | Fabbio | 711/163 |
| 5,446,880 | A | * | 8/1995 | Balgeman et al. | 707/9 |
| 5,450,581 | A | * | 9/1995 | Bergen et al. | 707/9 |
| 5,611,076 | A | * | 3/1997 | Durflinger et al. | 707/102 |
| 5,826,268 | A | * | 10/1998 | Schaefer et al. | 707/9 |
| 5,895,467 | A | * | 4/1999 | Ubell et al. | 707/9 |
| 6,006,234 | A | * | 12/1999 | Govindarajan et al. | 707/103 R |
| 6,041,412 | A | * | 3/2000 | Timson et al. | 726/3 |
| 6,202,066 | B1 | * | 3/2001 | Barkley et al. | 707/9 |
| 6,233,576 | B1 | * | 5/2001 | Lewis | 707/9 |
| 6,442,566 | B1 | * | 8/2002 | Atman et al. | 707/103 R |
| 6,446,092 | B1 | * | 9/2002 | Sutter | 707/203 |
| 6,708,186 | B1 | * | 3/2004 | Claborn et al. | 707/102 |
| 2002/0116385 | A1 | * | 8/2002 | Kagalwala et al. | 707/100 |
| 2004/0117371 | A1 | * | 6/2004 | Bhide et al. | 707/9 |
| 2005/0021780 | A1 | * | 1/2005 | Beyda | 709/229 |

OTHER PUBLICATIONS

Author: Chris Strahorn Title: Security in Next-Generation Database Publisher: http://www.db.cs.ucdavis.edu/teaching/289F/papers/chris.pdf Date: Nov. 16, 1998 Pertinent pp. 11.*

* cited by examiner

*Primary Examiner*—Isaac M Woo
*Assistant Examiner*—Syling Yen
(74) *Attorney, Agent, or Firm*—Workman Nydegger

(57) ABSTRACT

Provided are systems and methods that facilitate providing permission to entities of a database. A system includes a component that authorizes a principal of a containing entity to grant a permission to that entity, and a component that grants the permission to the containing entity, the grantee of the permission inherits a set of permissions to one or more entities contained by the containing entity. When a permission is granted to a parent in a hierarchy of a relational database, the permission is inherited by the child nodes. Also provided is a method for transferring ownership of entities in a relational database. The method includes a two-part handshake that can be audited to avoid repudiation issues.

28 Claims, 10 Drawing Sheets

SPECIFICATION OF A HIERARCHICAL AUTHORIZATION MODEL FOR A DBMS—SQL LANGUAGE EXTENSIONS

BACKGROUND

With the increasing popularity of computers, more and more data is being stored in relational databases. Information stored in databases is routinely accessed through the Internet. Users can access data stored in databases with personal computers (PCs), handheld computers, smart-phones, and the like. Relational databases organize data in the form of user tables that are further congregated into collections referred to as schemas. A database is often a self-contained unit of schemas and other objects and is often a domain of administration.

Tabular data is queried from a database using an ISO/ANSI (International Organization for Standardization/American National Standards Institute) standard language called SQL (Structured Query Language). Authorization is a process by which a database management system (DBMS) discriminates access to such tables.

Both commercial (e.g., Oracle-brand, Sybase-brand, DB2-brand) and non-commercial (e.g., Exodus-brand, Postgres-brand) database management systems (DBMSs) are utilized to provide for authorization to such resources. However, mechanisms are not provided that allow for the specification of a generic uniform authorization model.

ISO/ANSI SQL specifies a dialect to provision security on objects defined in the standard, such as tables and user-defined types. Thus, conventional DBMS are complex and consist of a variety of additional types of objects not defined in the ISO/ANSI standard. In addition, these objects are related to one another in complex ways.

Therefore, what is needed is a specification and implementation of extensions to the SQL language both syntactically and semantically to accommodate the definition of authorization rules in DBMS.

SUMMARY

The following presents a simplified summary of one or more embodiments in order to provide a basic understanding of some aspects of such embodiments. This summary is not an extensive overview of the one or more embodiments. It is intended to neither identify key or critical elements of the embodiments nor delineate the scope of such embodiments. Its sole purpose is to present some concepts of the described embodiments in a simplified form as a prelude to the more detailed description that is presented later.

The one or more embodiments disclosed and claimed herein, in one aspect thereof, comprises a system that facilitates providing a permission model to entities of a relational database management system. The entities in relational database systems are organized in hierarchies. An extension to the ISO/ANSI SQL standard grammar is provided to accommodate the hierarchical permissions model and to propagate the permissions correctly across the hierarchy.

According to another aspect is a system for providing permissions inheritance in a relational database system. A GRANT permission is granted on a parent node in a hierarchy. This permission is automatically inherited by all child nodes underneath or contained in the parent node on which the GRANT was performed. This provides administrative convenience because a GRANT SELECT once on the schema, for example, applies to all current and future tables in that schema.

According to another aspect is a method for changing ownership of entities of a database. The method includes authenticating an owner with an entity and transferring ownership through a two-part handshake. The method comprises a GRANT TAKE OWNERSHIP permission, to grant the permission to a principal. The method further includes receiving an ALTER AUTHORIZATION statement from the principal that indicates acceptance of ownership and thereafter transferring ownership to the principal.

The following description and the annexed drawings set forth in detail certain illustrative aspects of the one or more embodiments. These aspects are indicative, however, of but a few of the various ways in which the principles of the various embodiments may be employed and the described embodiments are intended to include all such aspects and their equivalents. Other advantages and novel features will become apparent from the following detailed description when considered in conjunction with the drawings.

DETAILED DESCRIPTION

Figure 1:
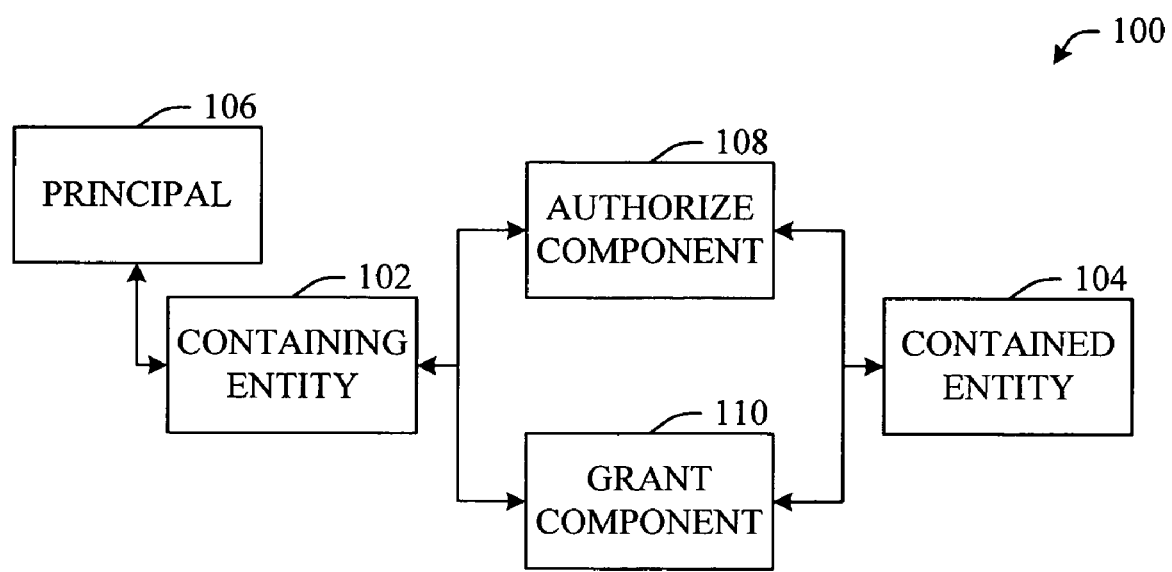
FIG. 1 illustrates a general component block diagram of a system that facilitates providing permission to entities of a database.

Various embodiments are now described with reference to the drawings, wherein like reference numerals are used to refer to like elements throughout. In the following description, for purposes of explanation, numerous specific details are set forth in order to provide a thorough understanding of one or more aspects. It may be evident, however, that the various embodiments may be practiced without these specific details. In other instances, well-known structures and devices are shown in block diagram form in order to facilitate describing these embodiments.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Referring initially to FIG. 1, a system 100 is shown. Generally, system 100 can include a containing entity 102 and a contained entity 104 whereby the containing entity 102 contains one or more entities that reside in a database. By way of illustration and not limitation, as used herein an entity can include one or more of the following: table(s), column(s), user-defined type(s), domain(s), sequence(s), schema(s), the server, the database, XML schema(s), CLR assemblies, user(s), role(s), application role(s), message type(s), service contract(s), service(s), remote service binding(s), route(s), full-text catalog(s), symmetric key(s), certificate(s), asymmetric key(s), endpoint(s), etc.

Entities can be further classified into two categories, namely, those that can be addressed by a unique identifier (typically derived from a unique multi-part name) and those that cannot be addressed by a unique identifier. Examples, of those that can be addressed by a unique identifier include tables, assemblies, stored procedures, etc. For these entities, the name is a suitable method to address them and this is the identifier utilized in recording permissions on those entities. Some entities, such as constraints, have unique identifiers, but are not independently securable. "Securable" refers to entities upon which permissions can be GRANTed, REVOKEd or DENYed, which will be discussed in more detail below.

Alternatively or in addition, constraints can be uniquely addressed by name. For example, entities created through utilization of data definition language (DLL) statements can have both a user-defined name and a system-generated, integer-valued identifier. The user-defined name and system-generated identifier are both unique and can be utilized to address the entity. For example, if a user performs "CREATE TABLE points(x float, y float)", the identifier "points" is user-defined and the system provides a generated number.

Entities that cannot be addressed by a unique identifier include rows in a table, for example. In general, rows do not have a unique identifier type, although in some tables a key can be sufficient to address them.

The containing entity 102 has an associated principal 106 (e.g., server principal, database principal, . . . ). A server principal, for example, can have a fixed server role and with its identity authenticated by a login and/or password (e.g., SQL login, OS login, OS group, certificate login, asymmetric key login, . . . ). Another exemplary principal can be a database principal with a (fixed) database and/or an application role. A database principal can be identified, for example, by a login and/or password (e.g., SQL user for SQL login, SQL User for OS login, SQL user for OS group, SQL user for certificate login, SQL user for asymmetric key login, . . . ). It should be noted that identification or authentication of a principal can be by any means and is not limited to a login (screen name) and/or password.

The system 100 further includes an authorize component 108 that authorizes the principal 106 and a grant component 110 that grants a permission to the containing entity 102. The principal can grant permission to the entity through one of a GRANT, a DENY, or a REVOKE declarative statement. Examples of permissions that can be GRANTed, REVOKEd, or DENYed are SELECT, INSERT, etc. A GRANT allows a grantee (a database or server principal who has been granted the permission) to perform an operation that needs this permission. A grantee is one who obtains a permission to access an entity. A DENY is when the grantee is denied permission to perform the operation. A REVOKE is when the grantee is neither granted nor denied permission. However, it is possible that some other grantor could have given this permission to the grantee. The operations are on the entity and the permissions control what operation(s) a grantee can apply to such entity. The granted permission can be based on a set of operations supported by the entity (e.g., SELECT on a table, EXECUTE on a procedure, . . . ). By way of illustration and not limitation in the below statement the owner and grantor is "me" and the entity is "mytable." The operation is SELECT and the permission is SELECT. The grantee in this example is "you."

GRANT SELECT ON OBJECT::mytable TO you

Figure 2:
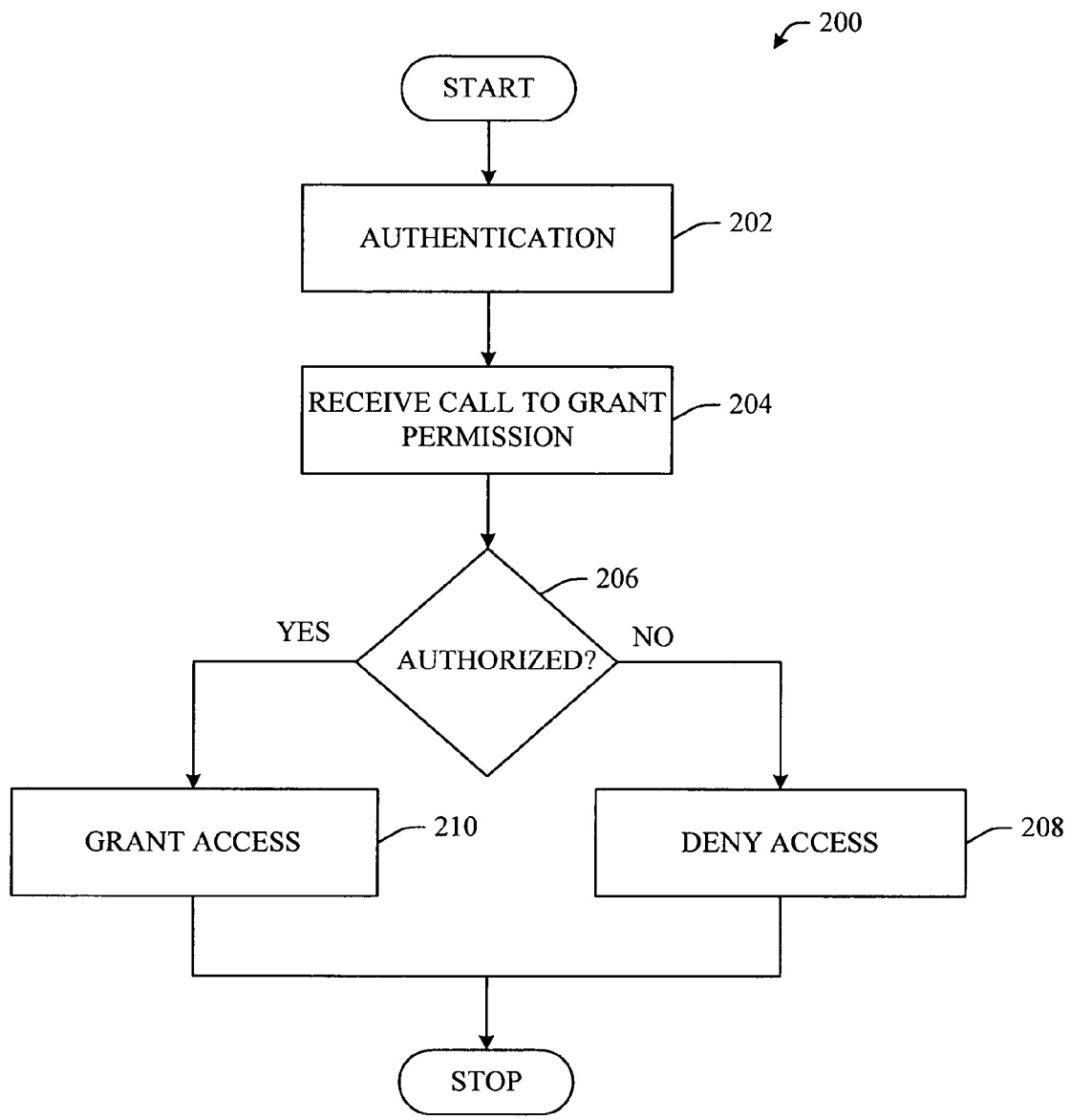
FIG. 2 illustrates an exemplary flow chart of a methodology for granting permission to entities of a database.

FIG. 2 illustrates an exemplary flow chart of a methodology 200 for granting permission to entities of a database. In view of the exemplary systems shown and described herein, methodologies, which may be implemented in accordance with one or more aspects disclosed herein, will be better appreciated with reference to the methodologies. While, for purposes of simplicity of explanation, the methodologies are shown and described as a series of function blocks, it is to be understood and appreciated that the methodologies are not limited by the order of the blocks, as some blocks may, in accordance with these methodologies, occur in different orders and/or concurrently with other blocks from that shown and described herein. Moreover, not all illustrated blocks may be required to implement the following methodologies. It is to be appreciated that the various blocks may be implemented via software, hardware, a combination thereof or any other suitable means (e.g. device, system, process, component) for carrying out the functionality associated with the blocks. It is also to be appreciated that the blocks are merely to illustrate certain aspects in a simplified form and that these aspects may be illustrated via a lesser and/or greater number of blocks.

The methodology 200 begins, at 202, where authentication of a principal is established in association with a containing entity. Authentication refers to a process by which an SQL server process validates and establishes the identity of a principal expressing the desire to access a resource. The identity of the principal can be established, for example, through a login process or other suitable means. At 204, a grant permission call is received. Permissions are a mechanism by which an owner (creator of an object) of an entity can delegate to another principal the ability to perform one or more operations on the entity or its subordinate entities. A principal that has been granted permission is referred to as the grantee (the owner should not be a grantee). The owner, additionally and/or alternatively, can permit the principal the ability to perform the operation and the ability to allow other principals to perform similar operations. In such a situation, the former principal is referred to as the grantor. A "GRANT" is a general term that includes GRANTing, DENYing, and/or REVOKEing permissions by a grantor to a grantee.

Although the aspects described herein are directed to an SQL Server-brand DBMS, it is to be appreciated that the novel functionality of the execution contexts described herein can be applied to any DBMS in any manner without departing from the sprit and scope of the specification and claims appended hereto. For example, the functionality of a "GRANT" statement described herein can be effected in any manner upon any DBMS or multi-domain system without departing from the novel aspects disclosed. The "GRANT" terminology is to be considered as one aspect and not to limit the various aspects disclosed herein in any way. In other words, the functionality of the "grant" grant statements described herein can be effected in countless statements.

GRANT calls can take various forms. An exemplary unified GRANT statement syntax can take the following form:

```
GRANT { securable_class_permission [ , . . . n ] }
ON securable_class :: instance of securable_class
TO security_account [ , . . . n ]
[ WITH GRANT OPTION ]
[ AS { owner |
security_account_with_permission_in_GrantWithGrant_State}]
```

The "securable_class::" syntax is an extension to the ISO/ANSI syntax and provides for a hierarchy of objects across multiple namespaces. This syntax allows the "instance_of_securable_class" to be resolved to the right place in the hierarchy. In such a way, the semantics provide permissions to be propagated across a containment hierarchy. The ON clause is for database or server level permissions. The optional WITH GRANT OPTION clause allows the grantee of the permission to grant the permission to other principals including principals who were previously denied permission. The optional AS clause specifies the grantor of the permission. Valid grantors are owner or principal who has been granted the permission(s) WITH GRANT OPTION in the grant statement.

Each GRANT is recorded individually in sys.database_permissions as a row containing the name of the permission, the class of the object the permission is on, the object instance the permission is on, the permission state, the grantor and grantee of the permission. By way of illustration and not limitation, the object_class is "TABLE", object_instance is "mytable", permission is "SELECT", grantor is "me", grantee is "you" and state is "GRANT". Therefore, I GRANT-ed you SELECT permission on mytable, which is an instance of the TABLE class.

With continuing reference to the above exemplary GRANT call, when the optional AS clause is omitted, the grantor is recorded either as the executor of the statement or the owner, depending on the permissions of the statement executor. On ownership change (which will be discussed further below) the permissions can be dropped. Permissions can also be dropped when the schema contained object is moved to a new schema.

Exemplary forms of the GRANT statement syntax can include server permissions (master database), endpoint permissions (master database), certificate permissions (master database), database permissions, schema permissions, assembly permissions, type permissions, full text catalog, permissions, service broker permissions, server principal (login) permissions (master database), database principal permissions, XML schema collection permissions, object permissions. Examples of these types of statements will be discussed below with regard to the GRANT WITH GRANT OPTION.

The syntax for a hierarchy of objects across multiple namespaces is provided in the exemplary generalized GRANT statement syntax (including DENY and REVOKE). Each entity allows at least one permission to be defined on it based on operations that are allowed on it. For example, an entity can GRANT SELECT permission on a table when the entity wants to allow others to perform the SELECT operation on the table. Some entities are related in a containment relationship (e.g., a database contains schemas). The generalized statement syntax provides that the GRANT statement encompasses a variety of different entities and relationships and is further defined, at least in part, by the following portion of the generalized statement syntax.

```
<scope> ::= [<securable_class_name> :: ]
<securable_instance_name>
```

According to another aspect, an exemplary unified syntax for a DENY can be:

```
DENY { securable_class_permission [ , . . . n ] }
ON securable_class :: instance of securable_class
TO security_account [ , . . . n ]
[ CASCADE ]
[ AS { owner |
security_account_with_permission_in_GrantWithGrant_State}]
```

The "securable_class::" extension to the syntax provides that the permission is propagated across a containment hierarchy properly. The ON clause is not used for database or server level permissions. It is possible to deny multiple permissions on the same object to multiple security_accounts in a single statement. Each DENY is recorded individually in sys.database_permissions as a row containing: the name of the permission, the class of the object the permission is on, the permission state (DENY) and the grantor and grantee of the permission.

The CASCADE clause can be utilized to deny permissions that have been granted WITH GRANT OPTION. The impact of the deny cascade is to deny all permissions in a permissions list of the DENY statement to the security_account and revoke all grants in the permission list of the DENY statement made by the security_account.

According to another aspect, below is an exemplary unified syntax for a REVOKE grant call.

```
REVOKE
[ GRANT OPTION FOR ]
{ securable_class_permission [ , . . . n ] }
ON securable_class :: instance of securable_class
{ TO | FROM} security_account [ , . . . n ]
[ CASCADE ]
[ AS { owner |
security_account_with_permission_in_GrantWithGrant_State}]
```

Once again "securable_class::" is provided as an extension to the syntax to provide that permissions are propagated across the hierarchy properly. The extension allows the "instance of securable_class" to be resolved to the proper place in the hierarchy. For the REVOKE call, the ON clause is not used for database or server level permissions. The GRANT OPTION FOR clause allows the revocation of the WITH GRANT OPTION portion of a GRANT WITH GRANT OPTION permission state. The GRANT OPTION FOR clause and the CASCADE clause go together.

The CASCADE clause is utilized to REVOKE permissions that have been granted WITH GRANT OPTION. The REVOKE CASCADE revokes all permissions in the permission list of the REVOKE statement to the security_account and revokes all grants in the permission list of the REVOKE statement made by the security_account.

With continuing reference to the above REVOKE call, the optional AS clause specifies the GRANTOR of the permission. Valid grantors are owners or database principals who have been granted permission(s) WITH GRANT OPTION in the GRANT statement. When the AS clause is omitted, the grantor is recorded either as the executor of the statement or the owner, depending on the permissions of the statement executor.

With continuing reference to FIG. 2, when a GRANT permission call is received, at 204, a determination is made, at 206, whether the principal has authorization to grant the permission. Authorization is the process by which the server determines whether a given identity is allowed to access a resource. If it is determined that there is not the proper authorization ("no"), access is denied, at 208. If it is determined, at 206, that there is proper authorization ("yes"), at 210, access is granted.

Figure 3:
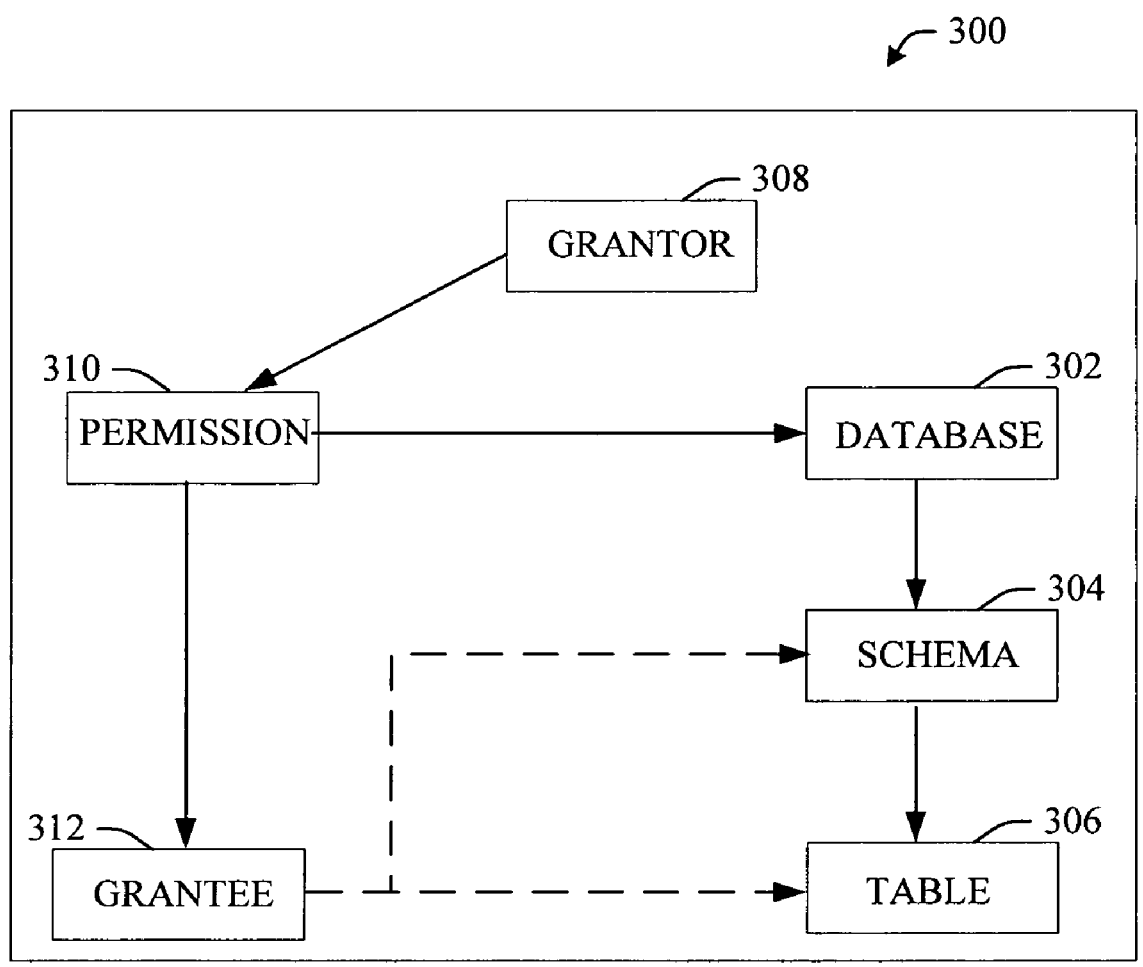
FIG. 3 is a component block diagram of a system that facilitates granting a database-level permission.

Referring now to FIG. 3, illustrated is a component block diagram of granting a database-level permission on a containment hierarchy 300. There are different relationships in databases, for example, containment relationships (e.g., a database contains schemas) and/or referential relationships (e.g., a view refers to a table of which it is defined). By way of illustration and not limitation, a containment relationship may contain a schema that has an owner with full permissions on all entities that are contained within that schema. However, the schema itself has a container (the database) that has an owner (the database owner). The permissions on the containing and contained entities are related in a permission lattice. That is to say, the grantee of a permission on the containing entity inherits a set of permissions on the contained entity, based on the actual permission that is being held.

The exemplary illustration of FIG. 3 includes a database 302 that contains schema(s) 304 and table(s) 306. As illustrated, a grantor 308 (or principal) grants a permission 310 on the database 302 or parent node to a grantee 312 (e.g., a database-level permission). By virtue of a permission inheritance across the containment hierarchy, the grantee 312 effectively has the same permission on all the contained subentities (schema(s) 304 and table(s) 306) or child nodes. This inheritance is illustrated by the dotted lines. Thus, the grantee 312 effectively holds the same permission on all the schema(s) 304 in the database 302 and on all the object(s) (illustrated as table(s) 306) in all of those schema(s) 304.

It should be noted that the permission on the lower-scopes (schema(s) 304 and/or table(s) 306) are computed dynamically rather than explicitly materialized. In other words, there is one physically persisted permission that covers a broad range of current (and future) sub entities contained on the lower scopes. This provides that locks are held for short periods while performing the GRANT. By way of illustration, in a situation where a database contains hundreds of schemas and each schema contains hundreds of objects, to materialize all of these grants, thousands of database locks would need to be obtained and held. This consumes resources, lowers concurrency, and increases the chances of contention. The disclosed one or more aspects mitigates the problems associated with this situation by utilizing the one physically persisted permissions to cover current and future sub entities contained on the lower scopes. That is to say, the physically persisted permissions cover the entities and sub entities that are currently existing on the lower scopes and additionally, covers future entities and/or sub entities that are created and/or associated with the lower scopes after the permission is granted.

Having one physically persisted permission that covers a broad range of current (and future) sub entities contained on the lower scopes also provides administrative convenience. Such a covering permission can imply child permissions at lower levels of the hierarchy providing that an administrator performs one GRANT at the database level rather than many individual GRANTs at the object level. This top-level GRANT applies to both current and future objects that appear at lower levels. Thus, an administrator performs the GRANT once and it is applied to future objects without further action by an administrator.

Figure 4:
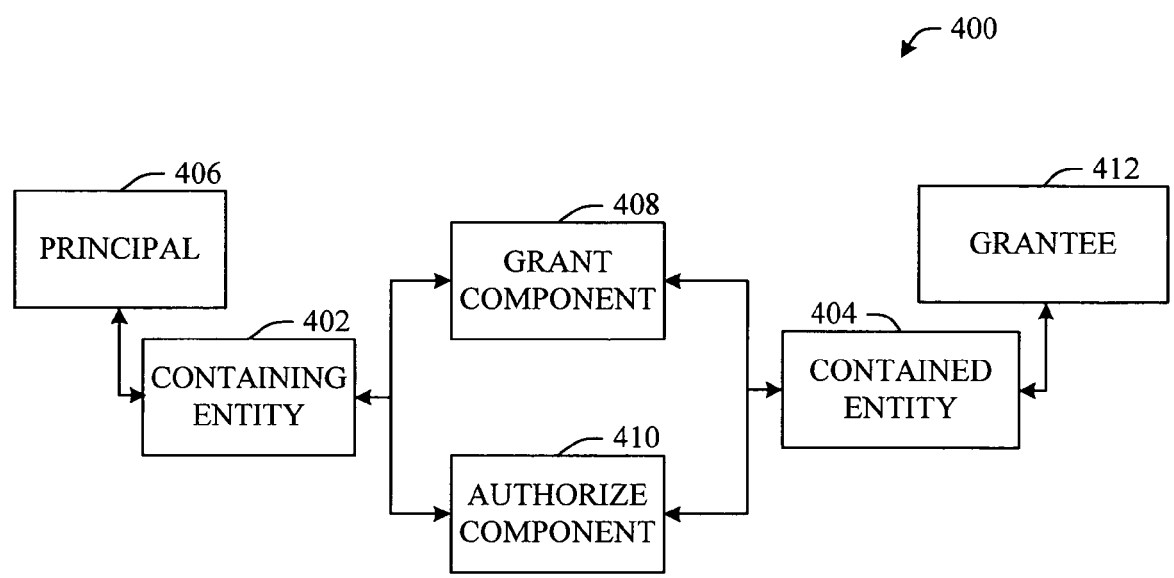
FIG. 4 illustrates a system that facilitates providing a grant with grant option to entities of a database.

FIG. 4 illustrates a system 400 that facilitates providing a GRANT WITH GRANT permission to entities of a database. System 400 includes a containing entity 402 that authorizes a principle 406 of the containing entity 402 to grant a permission to that entity. System 400 further includes a grant component 408 that grants the permission to the containing entity 402. A grantee 412 of the permission inherits a set of permissions to one or more entities contained by the containing entity (contained entity 404). According to a further aspect, the authorize component 408 further authorizes the grantee 412 to grant a permission to that entity. Thus, the principal 406 GRANTED grantee 412 permission on entity 402, 404 that allows grantee 412 to GRANT permission on that entity to others. This GRANT WITH GRANT OPTION establishes a "grant chain."

Figure 5:
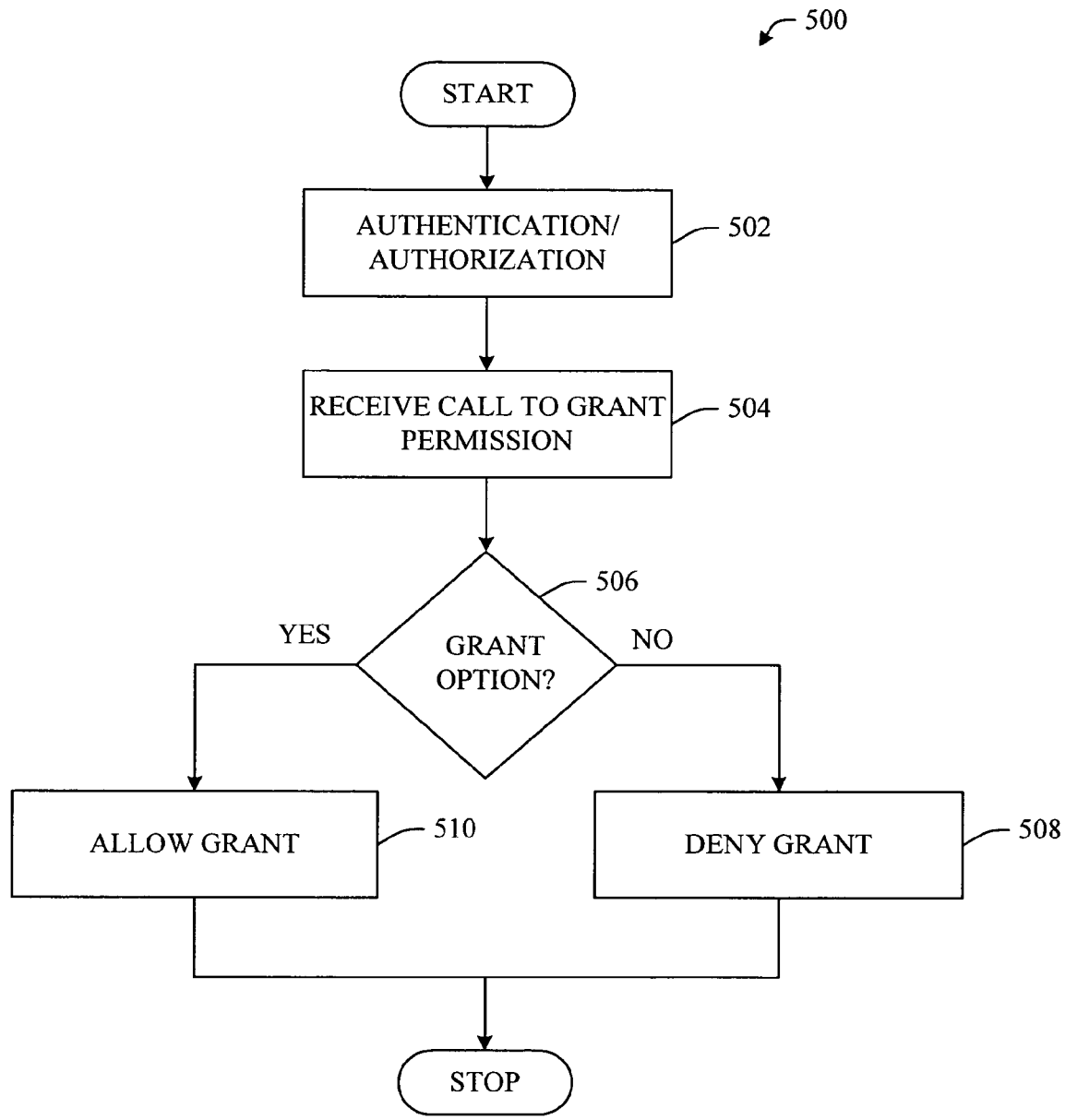
FIG. 5 illustrates a methodology of performing a grant with grant permission to entities of a database.

Referring now to FIG. 5, illustrated is a methodology 500 of a GRANT WITH GRANT OPTION that allows a grantee to perform an operation that utilizes the grant permission and allows the grantee to grant this permission to other principals, including principals who were previously denied permission. The methodology 500 begins at 502 where authentication and authorization of a grantee is established in association with a containing entity, this grantee can be a grantee who previously received permission from an owner or principal. Authentication is a process of validating and establishing the identity of one expressing the desire to access a resource. Authorization is a process of deciding whether a given identify is allowed to access a resource. At 504, a GRANT PERMISSION call is received whereby the grantee is attempting to grant permission to another.

At substantially the same time as the GRANT PERMISSION call is received, a determination is made, at 506, whether the grantee has permission to grant the permission to other principals through a GRANT WITH GRANT OPTION. The GRANT WITH GRANT OPTION allows one who has previously been given permission on an entity to transfer and/or allow another permissions on that entity. If the determination, at 506, is "no," the grantee does not have the grant permission and the grant is denied, at 508. A "no" determination indicates that the grantee was not given a GRANT WITH GRANT OPTION. If the determination, at 506, is "yes," the grantee does have grant permission and the grant is allowed at 510. The grant permission given to another, at 510, can allow that such another the permission to issue a permission, such as a GRANT WITH GRANT OPTION to a further grantee.

Figure 6:
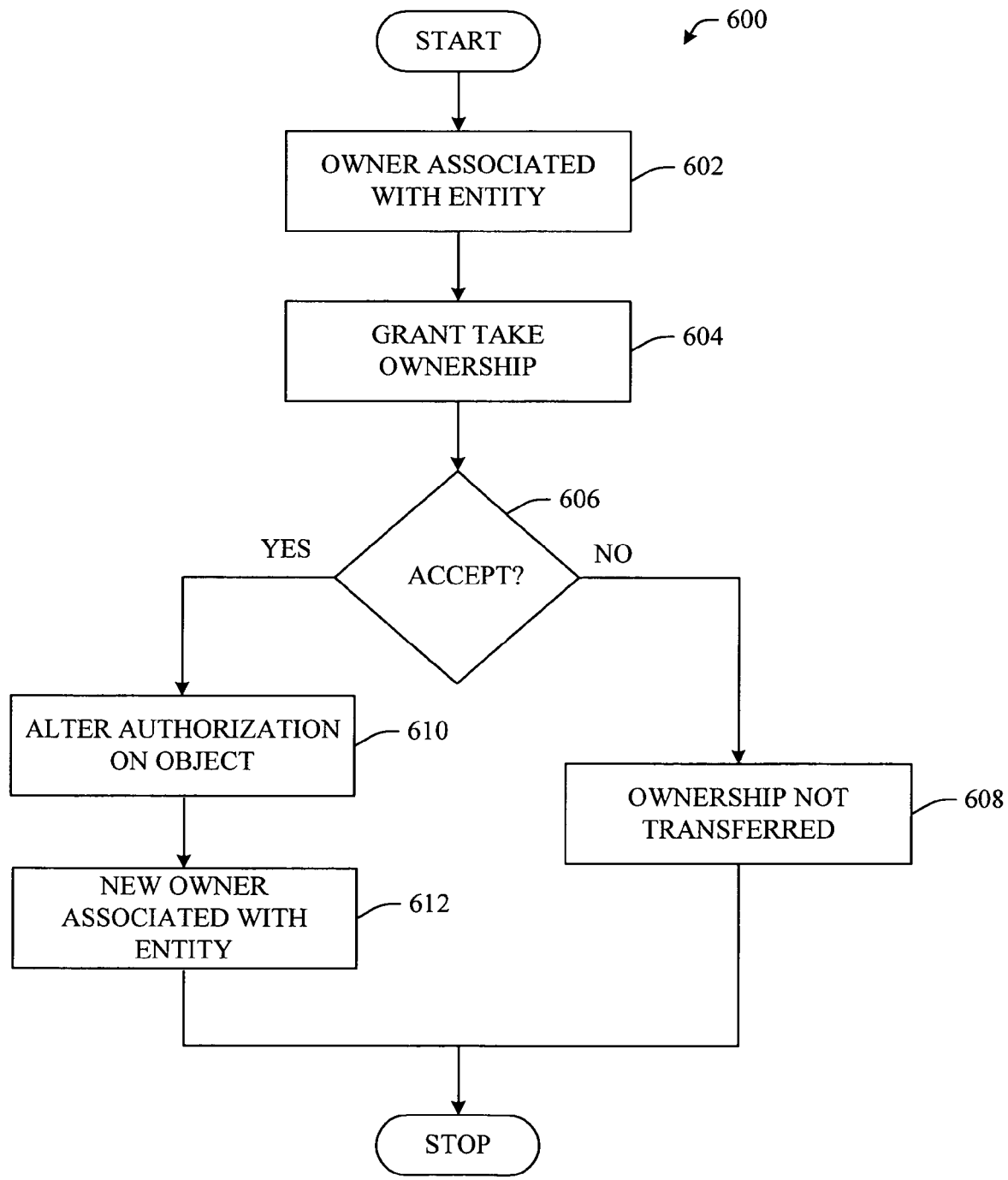
FIG. 6 illustrates a methodology for changing ownership.

Referring now to FIG. 6, illustrated is a methodology 600 for changing ownership of an entity. As stated previously, the owner of a securable entity possess full authority rights on that entity. The ISO/SQL CREATE SCHEMA statements allow a system administrator to establish an initial schema ownership:

---

CREATE SCHEMA <schema name> AUTHORIZATION <schema authorization identifier>

--- where <schema authorization identifier> represents a database user. A schema can be created establishing that a particular user is the owner, without regard to whether such user wanted to become the owner. This scenario is appropriate for system administrators, but not for non-system administrators that may want to transfer ownership of an existing schema or another type of object or entity.

Accordingly, a model providing every securable entity a grantable TAKE OWNERSHIP permission is provided. "Securable" refers to entities upon which permissions can be GRANTed, REVOKEd and/or DENYed. After the current owner of the entity grants permission to another principal, such other principal can take ownership of the entity. This is achieved with a two-handshake process that utilizes a GRANT TAKE OWNERSHIP statement and an ALTER AUTHORIZATION statement.

Generally, security systems are based on three types of users: administrators (who can claim ownership of any securable entity in the system), owners (who own entities they create), and users (who are granted permission by the owners to perform operations on the entities). Transferring ownership of securable entities utilizes these types of users. Members of the sysadmin fixed server role have permission to take ownership of any object (also grantable). Owners can GRANT other users the TAKE OWNERSHIP privilege. Those users who have the take ownership privilege on an entity can take ownership of such entity.

With reference to FIG. 6, the method starts, at 602, where an owner is associated with an entity. An entity can include one or more of the following: table(s), column(s), user-defined type(s), domain(s), sequence(s), schema(s), the server, the database, XML schema(s), CLR assemblies, user(s), role(s), application role(s), message type(s), service contract(s), service(s), remote service binding(s), route(s), full-text catalog(s), symmetric key(s), certificate(s), asymmetric key(s), endpoint(s), etc. The owner can be the creator of the entity and such owner is determined through an authentication and/or authorization process.

The owner can relinquish and/or transfer ownership of an entity without causing repudiation issues through a two-step handshake process. If the entity owner wants to transfer ownership on a table "T", for example, the entity owner issues a GRANT TAKE statement, at 604, to transfer such ownership to "New_Owner" (the quoted identifier can expressed as "[New Owner]"). The statement can be in the following format:

---
GRANT TAKE OWNERSHIP ON OBJECT:: T TO New_Owner
---

If New_Owner does not want to accept ownership of the Object, New_Owner does nothing and, at 608, ownership is not transferred to such New_Owner. If New_Owner wants to accept ownership of the Object, New_Owner accepts such ownership though an ALTER AUTHORIZATION statement. New_Owner can accept through a statement such as:

---
ALTER AUTHORIZATION ON OBJECT :: T TO New_Owner
---

New_Owner is now the owner associated with the entity, at 612, and the owner associated with the entity, at 602, is no longer associated with such entity. The ALTER AUTHORIZATION statement is an explicit take call and indicates that the potential New_Owner has requested to take ownership, and has not been forced into such ownership. This two-step handshake transfer can be audited, mitigating repudiation issues.

Figure 7:
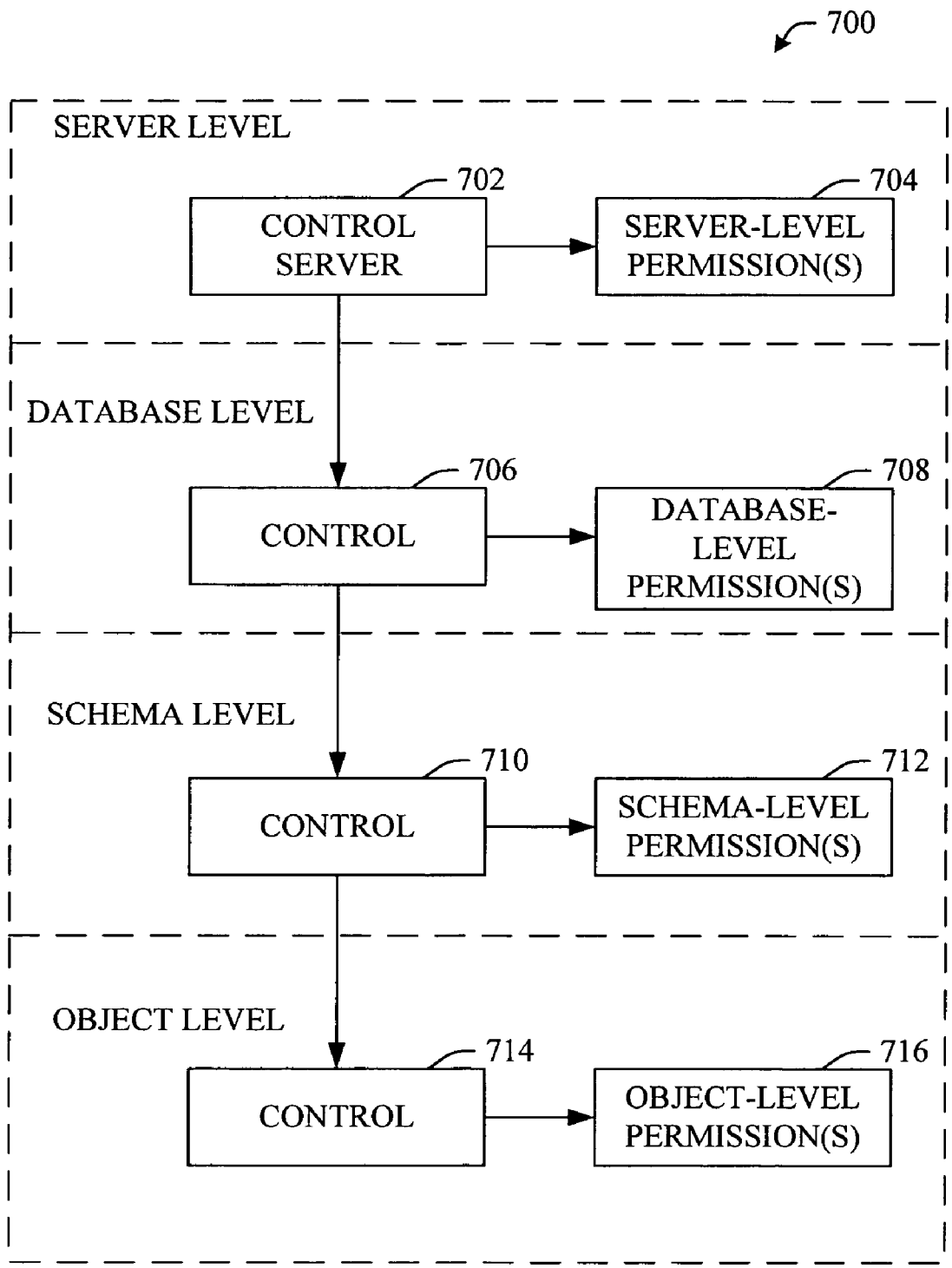
FIG. 7 illustrates an exemplary hierarchy and covering permission.

FIG. 7 illustrates an exemplary hierarchy and covering permission. This is a graphical depiction of one set of paths through a chain of level-spanning permissions implied by a CONTROL SERVER permission. CONTROL SERVER is a server-level permission that sits at the root of a permissions directed acyclic graph. A grantee holding the CONTROL SERVER is effectively a system administrator.

Permissions are defined at multiple levels of the system's containment hierarchy. For example, server-level permissions are defined on the server, schema-level permissions are defined on a particular schema instance, etc. A "covering permission" is one that implies one or more permissions at different places in the hierarchy. For example, an owner GRANTS a SELECT permission on a database (owner_database) to user. User now has the ability to SELECT from any and all existing and future tables, views, or table-valued function, etc. in any and all existing or future schemas on owner_database.

A covering permission may imply other sibling permissions at the same level of the hierarchy. For example, a CONTROL permission on a table implies the other table-level permissions. Therefore, if owner GRANTS user CONTROL on owner_table, this is similar to having GRANTed owner SELECT, INSERT, UPDATE, DELETE, and other relevant table-level permission. The covering permission can also imply child permissions at lower levels of the hierarchy. For example, if owner GRANTS user CONTROL on owner_schema, this is similar to owner giving user all relevant permissions on owner_schema and all relevant permissions on all existing or future table, view, and/or table-valued function. Covering permission can also be DENYed and/or REVOKEd.

With reference again to FIG. 7, the hierarchy 700 includes four levels (e.g., server, database, schema, object). Server level includes a CONTROL SERVER permission 702 that covers all other server-level permissions 704 (e.g., ALTER ANY CERTIFICATE). The CONTROL SERVER permission 702 can also cover the CONTROL permission 706 of all current and future databases at the database-level of the hierarchy 700.

The CONTROL permission 706 of the database level covers all other database-level permissions 708 (e.g., ALTER ANY SCHEMA) and the CONTROL permission 710 of all current and future schemas at the schema-level of the hierarchy 700. The CONTROL permission 710 of the schema covers all other schema-level permissions 712 (e.g., ALTER) and the CONTROL permission 714 of all current and future objects at the object level (e.g., tables, views, procedures, functions, etc.). The CONTROL permission 714 of an object covers all relevant object level permissions 716 (e.g., SELECT).

Figure 8:
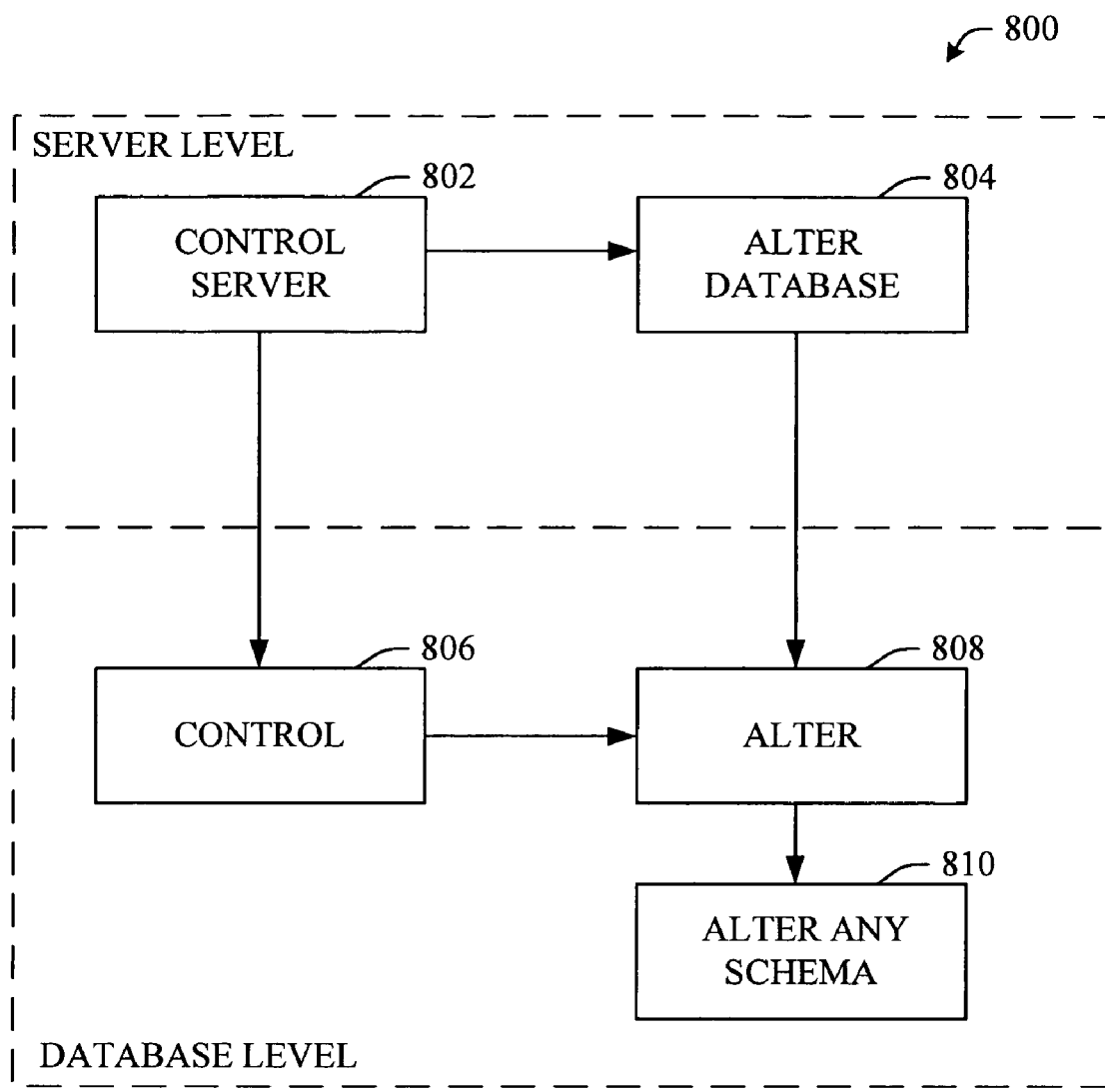
FIG. 8 illustrates another exemplary hierarchy and covering permission.

Referring now to FIG. 8, illustrated is another exemplary hierarchy 800 and covering permission. The hierarchy 800 includes a server level and a database level. Server level includes a CONTROL SERVER permission 802 that covers, for example, an ALTER DATABASE 804 permission and a CONTROL permission 806 of the database level. The CONTROL permission 806 covers, for example, an ALTER permission 808, which is also covered by the ALTER DATABASE 804 in the server level. The ALTER ANY SCHEMA permission 810 in the database level is covered by its sibling database-level ALTER permission 808.

Covering permissions can include "class" which is the kind of securable entity to which the permission applies. "Permission" is the name of the permission. It is to be understood that some permission names (e.g., ALTER) can apply to different classes (e.g., ALTER on a database, ALTER on a schema, etc.). "Parent class" is the type of securable entity of the container class. The server is the top-most class and has no "parent." "Parent covering permission" is the name covering permission at the parent level of the hierarchy. "Permission type" is a chart code found in a type column.

Figure 9:
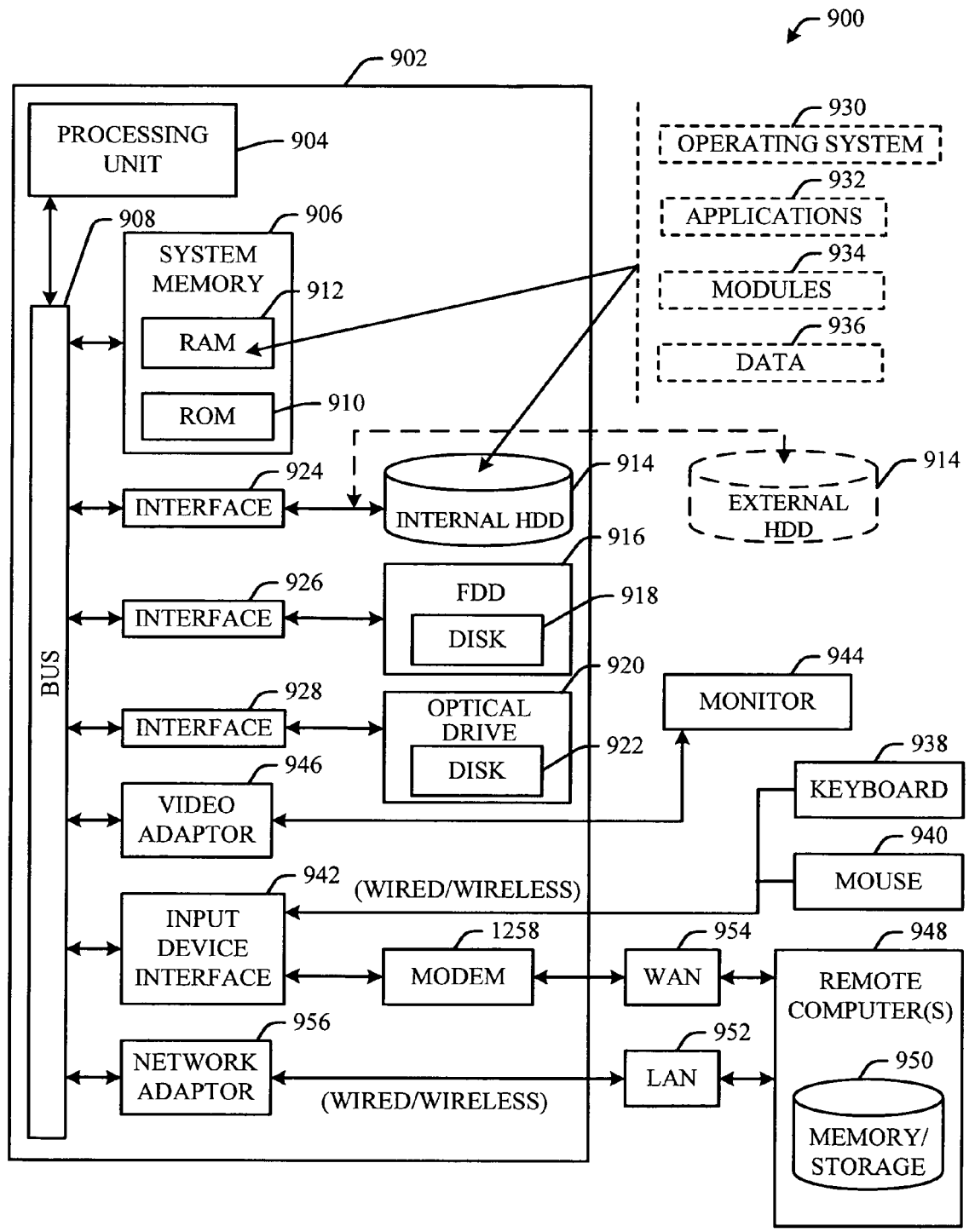
FIG. 9 illustrates a block diagram of a computer operable to execute the disclosed embodiments.

Referring now to FIG. 9, there is illustrated a block diagram of a computer operable to execute the disclosed architecture. In order to provide additional context for various aspects disclosed herein, FIG. 9 and the following discussion are intended to provide a brief, general description of a suitable computing environment 900 in which the various aspects can be implemented. While the one or more embodiments have been described above in the general context of computer-executable instructions that may run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the one or more embodiments.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods disclosed herein.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the various embodiments can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
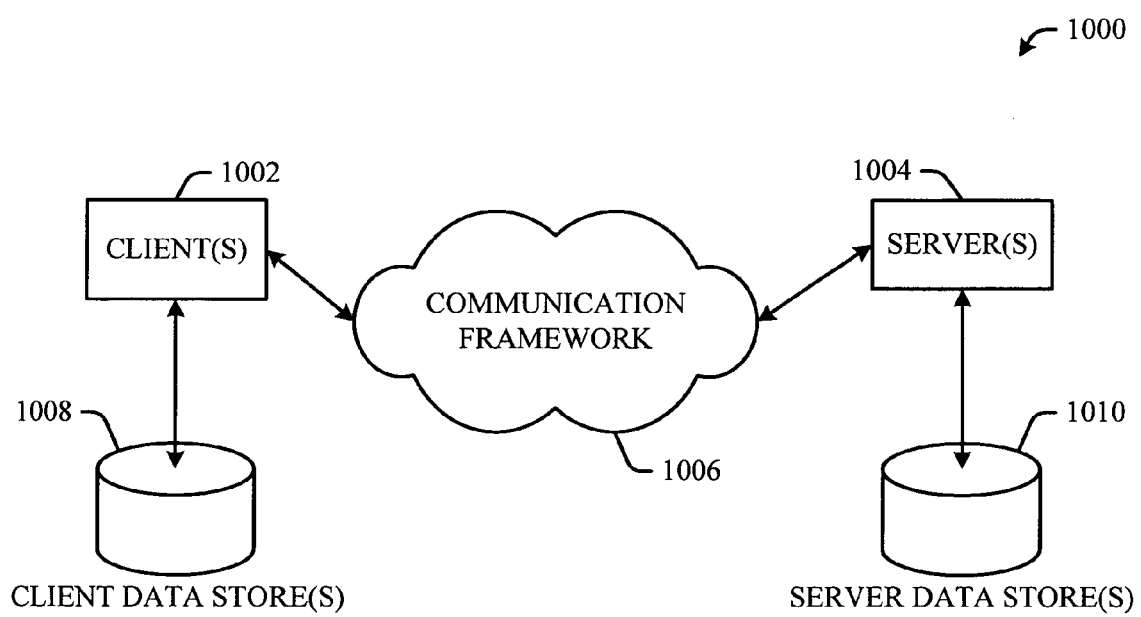
FIG. 10 illustrates a schematic block diagram of an exemplary computing environment operable to execute the disclosed embodiments.

Referring now to FIG. 10, there is illustrated a schematic block diagram of an exemplary computing environment 1000 in accordance with the various embodiments. The system 1000 includes one or more client(s) 1002. The client(s) 1002 can be hardware and/or software (e.g., threads, processes, computing devices). The client(s) 1002 can house cookie(s) and/or associated contextual information by employing the various embodiments, for example.

The system 1000 also includes one or more server(s) 1004. The server(s) 1004 can also be hardware and/or software (e.g., threads, processes, computing devices). The servers 1004 can house threads to perform transformations by employing the various embodiments, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the various embodiments. It is, of course, not possible to describe every conceivable combination of components or methodologies for purposes of describing the various embodiments, but one of ordinary skill in the art may recognize that many further combinations and permutations are possible. Accordingly, the subject specification intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

The invention claimed is:

1. A database management system that facilitates providing permission to entities of a database, comprising:
   a processor operatively coupled to a computer readable medium having stored thereon the following computer executable components:
      a component for authorizing a principal of a containing entity of a database to dynamically grant a permission to that entity by providing extended syntax grammar of a database query language that accommodates a hierarchical permissions model;
   a component for dynamically granting the permission to the containing entity, the grantee of the permission inherits a set of permissions to one or more entities contained by the containing entity;
      a component for performing a two-step authentication and authorization handshake for a grantee to transfer permission for an entity to a principal without a repudiation issue by authenticating a principal with an entity, receiving a call from the principal to relinquish ownership of the entity, and determining if a call to accept ownership of the entity is received from a potential owner, wherein the two-step authentication and authorization component is further for performing two-step handshakes to effect permissions for administrators who can claim ownership of the securable entity, owners who take ownership of any entity that they create, and users who are granted permission by the owners to perform operations on the entity that they own, and wherein the granting component holds a lock for a short period while performing the grant by computing dynamically a permission on a lower scope schema or table rather than explicitly materializing such that there is one physically persisted permission that covers a current sub-entity and a future sub-entity contained on the lower scopes; and
      a component for creating a schema with a securable entity for which permissions can be granted, revoked, or denied, and with a grantable take ownership permission without regard to whether a particular user desires ownership.

2. The database management system of claim 1, the permission to the containing entity is granted through a GRANT SELECT permission.

3. The database management system of claim 2, the GRANT SELECT permission is applied to one or more entities presently contained by the containing entity.

4. The database management system of claim 2, the GRANT SELECT permission is applied to one or more future entities contained by the containing entity.

5. The database management system of claim 1, the principal grants permission to the entity through one of a GRANT, a DENY, and a REVOKE statement.

6. The database management system of claim 1, the granted permission is based on a set of operations of the entity.

7. The database management system of claim 1, the one or more entities are contained in a relational database system.

8. The database management system of claim 1, the one or more entities contained by the containing entity are child nodes.

9. The database management system of claim 1, wherein the authenticating and authorizing component is further for associating the potential owner with the entity if a call to accept ownership of the entity is received from the potential owner.

10. The database management system of claim 9, wherein the authenticating and authorizing component is further for disassociating the principal from the entity.

11. The database management system of claim 1, wherein the authenticating and authorizing component is further for receiving a call for the principal to relinquish ownership to the potential owner is in the form of a GRANT TAKE statement.

12. The database management system of claim 1, wherein the authenticating and authorizing component is further for receiving a call from the potential owner to accept ownership of the entity is in the form of an ALTER AUTHORIZATION statement.

13. The database management system of claim , wherein the authenticating and authorizing component is further for transferring ownership when the entity has a grantable take ownership permission.

14. The database management system of claim 1, wherein the authenticating and authorizing component is further for auditing an ownership transfer to mitigate repudiation issues.

15. A method for facilitating providing permission to entities of a database, comprising:
   employing a processor executing computer executable instructions stored on a computer readable storage medium to implement the following acts:
      authorizing a principal of a containing entity of a database to dynamically grant a permission to that entity by providing extended syntax grammar of a database query language that accommodates a hierarchical permissions model;
      dynamically granting the permission to the containing entity, the grantee of the permission inherits a set of permissions to one or more entities contained by the containing entity;
      performing a two-step authentication and authorization handshake for a grantee to transfer permission for an entity to a principal without a repudiation issue by authenticating a principal with an entity, receiving a call from the principal to relinquish ownership of the entity, and determining if a call to accept ownership of the entity is received from a potential owner, wherein two-step authenticating and authorizing is by performing two-step handshakes to effect permissions for administrators who can claim ownership of the securable entity, owners who take ownership of any entity that they create, and users who are granted permission by the owners to perform operations on the entity that they own, and wherein dynamically granting by holding a lock for a short period while performing the grant by computing dynamically a permission on a lower scope schema or table rather than explicitly materializing such that there is one physically persisted permission that covers a current sub-entity and a future sub-entity contained on the lower scopes; and
      creating a schema with a securable entity for which permissions can be granted, revoked, or denied, and with a grantable take ownership permission without regard to whether a particular user desires ownership.

16. The method of claim 15, granting the permission to the containing entity by granting a GRANT SELECT permission.

17. The method of claim 16, granting the GRANT SELECT permission by applying to one or more entities presently contained by the containing entity.

18. The method of claim 16, granting the GRANT SELECT permission by applying to one or more future entities contained by the containing entity.

19. The method of claim 15, wherein the principal grants permission to the entity through one of a GRANT, a DENY, and a REVOKE statement.

20. The method of claim 15, wherein the granted permission is based on a set of operations of the entity.

21. The method of claim 15, wherein the one or more entities are contained in a relational database system.

22. The method of claim 15, wherein the one or more entities contained by the containing entity are child nodes.

23. The method of claim 15, further comprising authenticating and authorizing by associating the potential owner with the entity if a call to accept ownership of the entity is received from the potential owner.

24. The method of claim 23, further comprising authenticating and authorizing by disassociating the principal from the entity.

25. The method of claim 15, further comprising authenticating and authorizing by receiving a call for the principal to relinquish ownership to the potential owner is in the form of a GRANT TAKE statement.

26. The method of claim 15, further comprising authenticating and authorizing by receiving a call from the potential owner to accept ownership of the entity is in the form of an ALTER AUTHORIZATION statement.

27. The method of claim 15, further comprising authenticating and authorizing component by transferring ownership when the entity has a grantable take ownership permission.

28. The method of claim 15, further comprising authenticating and authorizing by auditing an ownership transfer to mitigate repudiation issues.

* * * * *

UNITED STATES PATENT AND TRADEMARK OFFICE
CERTIFICATE OF CORRECTION

| | | |
|---|---|---|
| PATENT NO. | : 7,613,711 B2 | Page 1 of 1 |
| APPLICATION NO. | : 11/151998 | |
| DATED | : November 3, 2009 | |
| INVENTOR(S) | : Tanmoy Dutta et al. | |

It is certified that error appears in the above-identified patent and that said Letters Patent is hereby corrected as shown below:

In column 16, line 13, in Claim 13, delete "claim ," and insert -- claim 1, --, therefor.

Signed and Sealed this
Twenty-second Day of February, 2011

David J. Kappos
*Director of the United States Patent and Trademark Office*